INVENTOR
HENRICUS A. VAN BAKEL
JOHANNES H. JANSSEN
BY
AGENT

United States Patent Office 3,220,059
Patented Nov. 30, 1965

3,220,059
PROPORTIONING DEVICE FOR POWDER
Henricus Antonius van Bakel and Johannes Henricus Janssen, Emmasingel, Eindhoven, Netherlands, assignors to North American Philips Company, Inc., New York, N.Y., a corporation of Delaware
Filed Nov. 5, 1962, Ser. No. 235,332
Claims priority, application Netherlands, Nov. 3, 1961, 270,998
4 Claims. (Cl. 18—30)

This invention relates to proportioning devices comprising a carrier having one or more mould cavities which open into the surface of the carrier and also comprising a member which being arranged above said surface has an outflow opening directed to said surface, in which this member is adapted to be connected to powder supply and can slide relative to said surface, thus allowing a quantity of powder streaked off by said member to pass to a mould cavity in the carrier. Such a device is known.

In devices of the known type a mould cavity is brought into direct communication with the powder and filled when the member is moved over the cavity. Any excess powder which is passed and projects above the cavity is streaked off by the inner wall of the member during the sliding movement thereof.

When using a very fine powder having a grain size of, for example, several tens of mircons, the mould cavity has been found not always to be filled completely. In proportioning such a fine powder it also frequently occurs that the excess referred to, which projects above the cavity, is absent. These difficulties becomes manifest more particularly if the mould cavity furthermore has the shape of an annular slot having a depth which is large relative to the width of the slot. Such a shape will be found, for example, in cases where rings have to be pressed from a quantity of powder.

Efforts have been made to overcome these difficulties by adding to the powder to be proportioned a quantity of flow facilitating agents which are not injurious to the powder. However, it has been found that an addition of maximum permissible quantities of such agents hardly add to a better reproducibility of the filling of the mould cavities.

An object of the invention is to provide a proportioning device for filling mould cavities in a reproducible manner.

The proportioning device according to the invention is characterized in that the member surrounds a plurality of rotary bodies bearing on the upper surfaces of the carrier. By the introduction of a plurality of said bodies it is rendered possible for the fine powder in the member to be kept in motion which greatly enhances a regular flow of the fine powder to the mould cavity.

The member which moves over to the carrier upon proportioning, ensures that said bodies are rotated relative to the inner wall of the member. Separate driving means are thus not required for rotating the bodies.

Keeping the powder present in the member in motion during proportioning may be facilitated still further by utilizing a further embodiment of the device according to the invention in which the bodies lie free in the member. In this embodiment the bodies thus remain freely movable relative to the inner wall of the member and it is possible for them to perform also a translation relative to said inner wall. The whole of the space adjacent the upper surface of the carrier and surrounded by the inner wall of the member then remains accessible to the bodies. The bodies located freely will naturaly be chosen of a size such that they cannot find their way into a mould cavity itself as the nozzle moves over it.

In order to have the absolute security that the bodies surrounded by the member are always set into motion upon the sliding movement of the member, in another embodiment of the device according to the invention the bodies are formed as bodies of revolution, for example balls. The better the spherical shape is approximated, the more optimum is the rolling movement over the surface of the carrier.

In order that the invention may be readily carried into effect, it will now be described in detail, by way of example, with reference to the accompanying diagrammatic drawing, in which.

Figure 1:
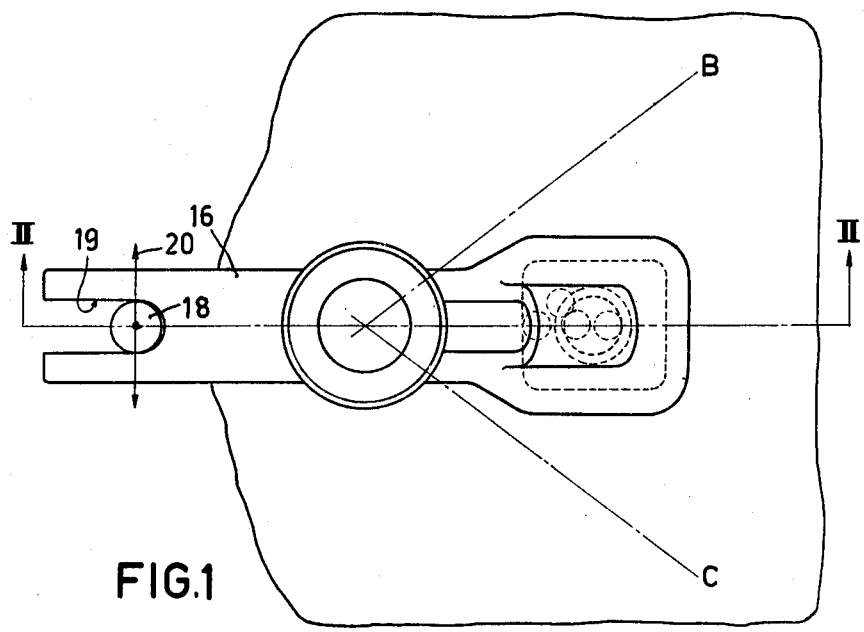
FIGURE 1 shows the proportioning device according to the invention when used in an arrangement, shown in part, for pressing rings from powder.
Figure 2:
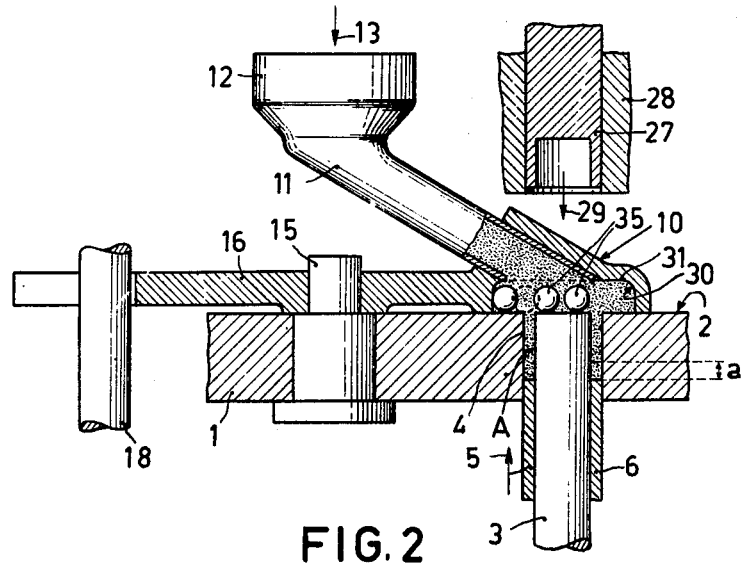
FIGURE 2 is a sectional view taken along the line II—II of FIGURE 1.

A carrier 1 has an annular mould cavity A opening in its upper surface 2, which cavity is formed by the space between a fixedly arranged shaft 3 and the wall of a bore 4 provided in the carrier 1. The depth of the cavity is limited by a sleeve 6 which can be moved in a constrained manner in a direction indicated by arrow 5.

Also an inverted generally cup-shaped member 10 is provided which communicates through a tube 11 with a funnel 12 which may be connected to a supply of powder as indicated by arrow 13. The member 10 forms part of an arm 16 which can pivot about a shaft 15. The arm 16 is pivotable in the example with the aid of a pin 18 which can reciprocate in a slot 19 of arm 16 in the direction indicated by the double arrow 20. By imparting to pin 18 a reciprocating motion in the direction of arrow 20 the outflow aperture of the member 10 can thus perform a reciprocating motion over the upper surface 2 of carrier 1. The final positions between which the member 10 reciprocates are indicated by B and C in FIGURE 1. The member 10 each time moves over the mould cavity A during its reciprocating motion.

The member 10 can pass a quantity of powder to the mould cavity A when sliding across it. Any excess powder supplied is streaked off by the inner wall 30 of member 10 as it moves further, across the cavity.

Over the mould cavity A a die 27 is arranged in a fixedly arranged guide 28 to be movable in a vertical direction as indicated by arrow 29. If the member 10 occupies position B the die 27 is moved into the mould cavity A, the sleeve 6 invariably occupying the position shown. A quantity of powder filling the whole cavity A may now be pressed in the usual manner to form a ring of the thickness a. Once the ring is pressed the die 27 is moved back to the position shown. The formed ring may be pushed out of the mould cavity A by displacing the sleeve 6 in the direction indicated by arrow 5.

If the material to be proportioned is comparatively coarse-grained it fills a mould cavity fairly easily when the member slides across it. However, if a very fine powder is concerned, a certain arching of powder occurs in the hollow of the member 10 surrounded by the inner wall 30 and the wall part 31. Such arching prevents the powder from flowing regularly to the annular cavity A and of course the mold cavity is not filled uniformly each time member 10 passes over a mold.

Uniform filling of the mould cavity A can be obtained if the inner wall 30 of member 10 freely surrounds a plurality of rotary bodies such as balls 35. In the example shown, four such balls of equal diameter are used. When the member 10 is moved over the cavity A, these balls, guided by the inner wall 30, perform a rotational movement over the upper surface 2 of carrier 1 and keep the powder in the nozzle in motion. The balls 35 are chosen of a diameter such that they cannot find their way into the mould cavity A upon the sliding movement of member 10. In the example shown, the member can move between two positions B and C.

When the member 10 is moved from position B to position C said balls are pushed forward by the inner wall 30. At the end of this movement the member comes to a standstill preferably with a shock, the balls leaving the relevant wall portion and engaging an opposing portion of the inner wall 30. By subsequently moving member 10 back to its initial position B, the portion of the member pushing forward the balls is thus another portion of the inner wall 30. In this way the balls 35 keep the powder in the member 10 even further in motion.

If a reciprocating motion can be imparted neither to the member 10, nor to the carrier 1 for each proportioning, which case occurs, for example, if a carrier having a plurality of mould cavities continuously moves below along the member 10, and if it is still desired to impart a reciprocating motion to the balls relative to the inner wall of the member, this may be achieved by reciprocating the balls for each proportioning in, for example, an electromagnetic manner relative to the member.

In the example shown, the mould cavity has an internal diameter of 10 mms., the slot has a width of 1 mm. and a depth of 15 mms. The material to be proportioned was a synthetic resin powder mixed with a filler, about 85% of which had a grain size smaller than 60 microns. A plurality of steel balls having a diameter varying between 0.8 cm. and 1.8 cm. were tried and all of them were found to yield very satisfactory results.

In the example here described, the cavity A has an annular shape. It will be evident that the invention is also applicable to cavities of a different shape but which are likewise difficult to fill.

What is claimed is:

1. A proportioning device comprising, a carrier member having means defining at least one mold cavity therein, said cavity opening into the upper surface of said carrier, an inverted hollow member opening onto the upper surface of said carrier and slideably engaging said surface, a powder supply connected with said hollow member for discharging a quantity of powder into the mold cavity when said hollow member is slid over said mold cavity, a plurality of freely rotatable bodies of revolution within said hollow member, said bodies bearing on the said surface of said carrier, and said bodies being free for movement in any direction on said carrier surface within said hollow member.

2. A proportioning device according to claim 1 wherein said bodies of revolution are spheres.

3. In the combination of a carrier member having a plurality of molds opening into a surface thereof and a proportioning device for supplying powdered material to said molds, the improvement in said proportioning device comprising a hollow member movable over said surface for discharging a quantity of molding powder into said molds, said hollow member opening onto and slideably engaging the adjacent surface of said carrier member, a plurality of spheres confined within said hollow member, said spheres being free to contact the said surface of said carrier and the molds to be filled, said bodies also being free to move in any direction within said hollow member upon relative movement of said member and said carrier for uniformly filling and discharging said member and filling said molds.

4. Apparatus particularly useful for molding small parts comprising a carrier member, means defining at least one mold cavity opening into a surface of said carrier member, a proportioning device slideably engaging said carrier surface for filling said mold, said proportioning device comprising an inverted generally cup-shaped member engaging said surface and defining a hollow opening onto said surface, means for supplying molding powder to said hollow, a plurality of spheres bearing on said carrier and confined within said hollow, said spheres being rotatable and freely movable in any direction within said hollow, said spheres having a diameter large enough to prevent entry of a sphere into said hollow and not substantially less than the depth of said hollow defining means, said spheres being normally enveloped in said molding powder, and means for moving said cup-shaped member over said carrier for filling said mold cavity.

References Cited by the Examiner
UNITED STATES PATENTS

| | | | |
|---|---|---|---|
| 1,813,828 | 7/1931 | Turner et al. | |
| 2,127,994 | 8/1938 | Davis et al. | 18—16 XR |
| 2,218,196 | 10/1940 | Hager | 25—103 XR |
| 2,614,757 | 10/1952 | O'Farrell | 25—103 XR |
| 3,070,842 | 1/1963 | Fuller. | |

J. SPENCER OVERHOLSER, *Primary Examiner.*

MICHAEL V. BRINDISI, *Examiner.*